Aug. 24, 1954

L. TRANK 2,687,452

TELEPHONE REST

Filed April 3, 1950

LEONARD TRANK,
INVENTOR.

BY [signature]
ATTORNEY.

Patented Aug. 24, 1954

2,687,452

UNITED STATES PATENT OFFICE 2,687,452

TELEPHONE REST

Leonard Trank, Los Angeles, Calif.

Application April 3, 1950, Serial No. 153,656

8 Claims. (Cl. 179—157)

The present invention relates to a telephone rest which may be incorporated with the ordinary type of telephone hand set. Such a telephone set includes in one instrumentality a transmitter and a receiver, together with a connecting piece which functions as a means whereby the set may be held by the hand.

An object of the present invention is the provision of a telephone rest which will securely hold a receiver against the ear with the transmitter in a proper speaking position before the mouth. So far as the inventor is aware, the average device now on the market does not hold the telephone hand set properly or comfortably.

An object of the present invention is the provision of a telephone rest which may in one position closely encompass the handle portion of the telephone set and presents substantially no obstruction, and which device may be moved to a second position for the purpose of holding a telephone hand set automatically without use of the hand. The average device for supporting a telephone hand set on a shoulder is bulky, extends usually centrally of, and at a right angle to the handle portion and thus, prevents a ready gripping thereof by the hand. Furthermore, the average device now known to the inventor is unsightly in appearance.

A further object includes a telephone rest which is inexpensive in cost of manufacture, ornamental in appearance and generally superior to devices for holding telephones now known to the inventor.

Figure 1:
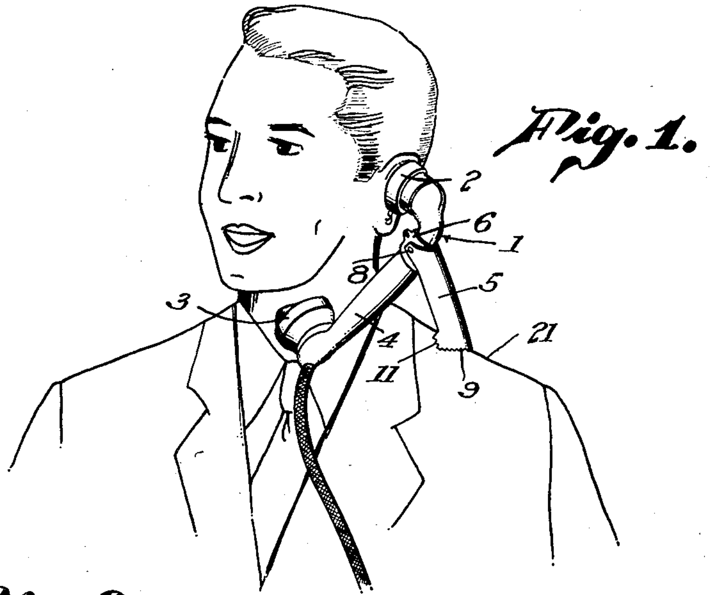
Figure 1 is a perspective view showing the invention holding a telephone hand set on a shoulder of its user.
Figures 2, 3:
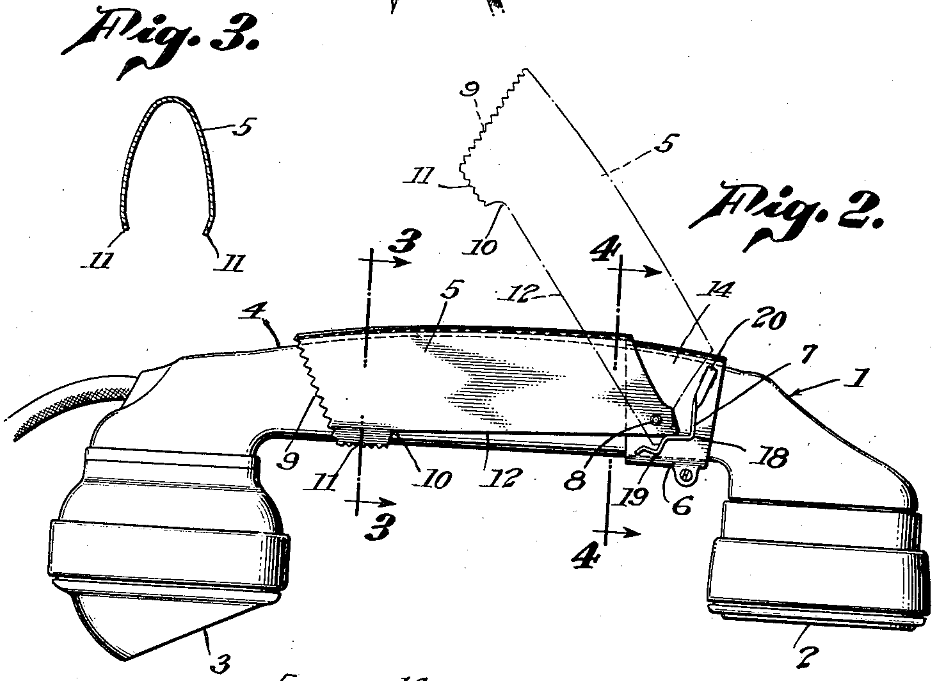
Figure 2 is a side elevation of a telephone hand set incorporating the invention.
Figure 3 is a sectional view of the telephone rest on the line 3—3 of Figure 2.
Figure 4:
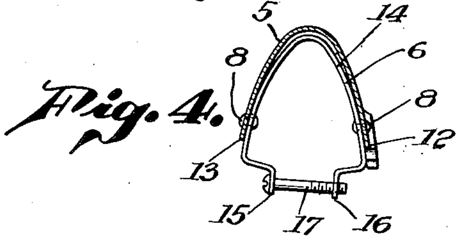
Figure 4 is a sectional view of the telephone rest on the line 4—4 of Figure 2.

Referring now to the drawing, I have shown in Figure 2 a combined telephone hand set 1 which includes a receiver 2, a transmitter 3, and an interconnecting handle member 4. The handle has a base with sides converging toward the top so that the hand may readily grasp the same. The invention is adapted to be secured to the handle 4.

The telephone rest includes an arm or strut 5, a clamp 6 and means 7 for holding the arm in two positions relative to the clamp. The arm 5 is preferably formed of either light metal or a plastic and is of a form which follows the section of the sides and top of the handle 4. As illustrated in Figure 3 and for convenience of description, the cross-section of Figure 3 will be designated as substantially U-shaped. The arm 5 is adapted to straddle and be pivoted at 8 to the clamp 6. The outermost end of said arm is serrated at 9 and the width of the arm is substantially uniform from the pivoted end thereof to the zone 10, at which point the width is increased to provide two converging lugs formed with edge serrations 11. The serrated end 9 is in angular relationship to edges 12 and 13 of said arm. The opposite end of the arm is at an angle substantially paralleling the end 9.

The clamp 6 includes a portion 14 adapted to overlie the top and sides and a part of the base of the handle 4 and is provided with two spaced apart parallel depending lugs 15 and 16, adapted to have a bolt 17 passed therethrough for the purpose of securing the clamp to the handle. It will be observed that this clamp conforms to the cross-section of the handle 4 so that the clamp, after bolting, will not creep in either direction along the handle. The clamp encompasses a small portion of the handle 4 adjacent receiver 2 and consequently, the hand in grasping the handle 4 will not, under normal use of the hand set, contact the clamp.

The means 7 comprises a flat spring bent to provide two step or catch portions 18 and 19, one end of said spring is fastened in any desired manner at 20 to the clamp, while the opposite hand is free or unrestrained.

The operation, uses and advantages of the invention just described are as follows:

The arm 5 may be positioned as shown in full lines in Figure 2 wherein the lugs shown at 10 may engage the edge of the handle 4 for the purpose of releasably holding said arm against unauthorized swinging movement. In addition the arm 5 is held in the position shown in Figure 2 by engaging the step portion 18 of the spring, the pivot point 8 being inward from the end of the arm. The arm may be swung to the dotted line position of Figure 2 whereupon the pivoted end of the arm will engage the step portion 19 and maintain the arm in angular relationship to the handle 4. The inclination given the pivoted end of the arm allows the arm to swing at a considerable angle relative to the clamp. Assuming that the arm has been swung to the dotted line position in Figure 2, the serrated end 9 will rest upon the shoulder 21 of a user of the hand set with the receiver 2 held against the ear.

When so positioned, the head may be turned and the hand set will be held quite securely against the ear with the result that the user will speak directly into the transmitter 3. Most telephone rests known to the inventor require that the head be cramped or bent at a considerable angle in order to hold the hand set. If the user of the hand set does not wish to use the telephone rest, the arm 4 may be moved from the dotted line position of Figure 2 to the full line position in said figure and as the arm 5 is quite thin and has the same cross-section as the handle 4, it will present little obstruction to the hand.

I claim:

1. The combination with a telephone hand set having a handle interconnecting a receiver and a transmitter, of: a strut adapted to overlie the top and sides of said handle and conforming to the cross-section thereof, one end of said strut provided with a U-shaped edge to engage the user's shoulder, and means for pivoting the opposite end of said strut to said handle.

2. The combination with a telephone hand set having a handle interconnecting a receiver and a transmitter, of: a strut having two side portions adapted to overlie and conform to the cross-section of the handle, means for pivoting one end of said strut for swing movement relative to said handle, and means for the opposite end of said strut providing snap engagement of said strut with said handle when the said strut overlies the handle.

3. The combination with a telephone hand set having a handle interconnecting a transmitter and a receiver, of: a clamp adapted to be secured to said handle, a strut pivoted to said clamp, and detent means carried by the clamp for holding said strut in either of two positions relative to the handle.

4. A shoulder support for a telephone hand set, comprising a clamp secured to the hand set, a strut to fit against the back of the hand set and pivoted to the clamp, the free end of the strut including an outer shoulder engaging portion making an acute angle with the back of the strut so as to lie approximately level on the user's shoulder and two spaced inner shoulder engaging portions each roughly parallel to the back of the strut and therefore meeting the outer shoulder portion at an obtuse angle.

5. The support of claim 4 in which the strut is of sheet material, U-shaped in cross section to embrace the hand set.

6. The support of claim 5 in which the three shoulder engaging portions are roughened to prevent slipping on the user's shoulder.

7. A shoulder support for hinging near the receiver end of a telephone hand set of the type in which the grip portion connecting the receiver and the transmitter is roughly triangular in cross section; comprising an elongated strut U-shaped in cross section to conform to the contour of the grip, having spaced coaxial pivots near one end with their axes parallel to the base of the grip, having at its two side edges near the free end a pair of lugs resiliently embracing the grip when the strut is in inoperative position, the outermost end of the strut making an obtuse angle with each of the lugs, the angle being such as to bring the free end of the strut into approximate parallelism with the shoulder of the user when the strut is in listening position, and means for holding the strut against movement about its pivot when the strut is in listening position.

8. The support of claim 7 in which the side edges and the outermost edge are roughened to prevent slipping, and the means is a spring anchored with respect to the hand set and has two indentations proximate one of the pivots of the strut whereby the strut is selectively latched in inoperative or in listening position.

References Cited in the file of this patent

UNITED STATES PATENTS

| Number | Name | Date |
|---|---|---|
| 1,336,929 | Simpson | Apr. 13, 1920 |
| 2,294,989 | Keely | Sept. 8, 1942 |
| 2,584,807 | Miller | Feb. 5, 1952 |